(12) United States Patent
Binder et al.

(10) Patent No.: US 7,980,437 B2
(45) Date of Patent: Jul. 19, 2011

(54) ROOF RACK SYSTEM FOR A VEHICLE, METHOD FOR PRODUCING THE ROOF RACK SYSTEM AND VEHICLE COMPRISING A ROOF RACK SYSTEM

(75) Inventors: Hans Binder, Böhmenkirch (DE); Ottmar Binder, Böhmenkirch (DE)

(73) Assignee: Hans und Ottmar Binder GmbH Oberflachenveredelung, Bohmenkirch (DE)

( * ) Notice: Subject to any disclaimer, the term of this patent is extended or adjusted under 35 U.S.C. 154(b) by 1140 days.

(21) Appl. No.: 11/663,665

(22) PCT Filed: Sep. 21, 2005

(86) PCT No.: PCT/EP2005/010198
§ 371 (c)(1),
(2), (4) Date: Mar. 23, 2007

(87) PCT Pub. No.: WO2006/032474
PCT Pub. Date: Mar. 30, 2006

(65) Prior Publication Data
US 2008/0099519 A1    May 1, 2008

(30) Foreign Application Priority Data

Sep. 24, 2004  (DE) .......................... 10 2004 047 565
Apr. 20, 2005  (DE) .......................... 10 2005 018 158

(51) Int. Cl.
*B60R 9/04* (2006.01)
*B60R 9/00* (2006.01)
*B60R 9/058* (2006.01)

(52) U.S. Cl. ........ 224/326; 224/309; 224/325; 224/327; 224/329; 224/330

(58) Field of Classification Search .................. 224/326, 224/309, 325, 317, 327, 324, 328, 329, 330, 224/331
See application file for complete search history.

(56) References Cited

U.S. PATENT DOCUMENTS

| | | | | |
|---|---|---|---|---|
| 4,911,349 A | * | 3/1990 | Miller | 224/326 |
| 5,312,005 A | * | 5/1994 | Odell | 211/189 |
| 5,782,392 A | * | 7/1998 | Yamamoto | 224/326 |
| 6,378,747 B1 | * | 4/2002 | Fisch et al. | 224/325 |

FOREIGN PATENT DOCUMENTS

| | | |
|---|---|---|
| DE | 36 26 926 A1 | 2/1988 |
| DE | 86 21 340 U1 | 7/1989 |
| DE | 89 10 936 U1 | 10/1990 |
| DE | 94 14 529.6 U1 | 12/1994 |
| DE | 196 49 758 A1 | 6/1998 |
| DE | 199 12 078 C2 | 9/2000 |
| DE | 202 05 087 U1 | 6/2002 |
| DE | 102 21 943 A1 | 11/2003 |
| DE | 10354117.9 | * 11/2003 |

* cited by examiner

*Primary Examiner* — Justin M Larson
*Assistant Examiner* — Lester L Vanterpool
(74) *Attorney, Agent, or Firm* — Harness, Dickey & Pierce, P.L.C.

(57) ABSTRACT

The invention relates to a roof rack system (1) for a vehicle, specifically for a passenger car, having at least one roof rail (2), which is configured in one piece and can be located on the vehicle body with an attaching device (13), wherein the roof rail (2) has a contact surface (27) extending over the length of the roof rail (2) which can be placed substantially continuously over its full length on the vehicle body (13) and is conformed to the vehicle body contour, and the attaching device has a retaining element (58) which is located in a cavity (60) of the roof rail (2) in the manner of a slot nut.

22 Claims, 8 Drawing Sheets

Figure 1:
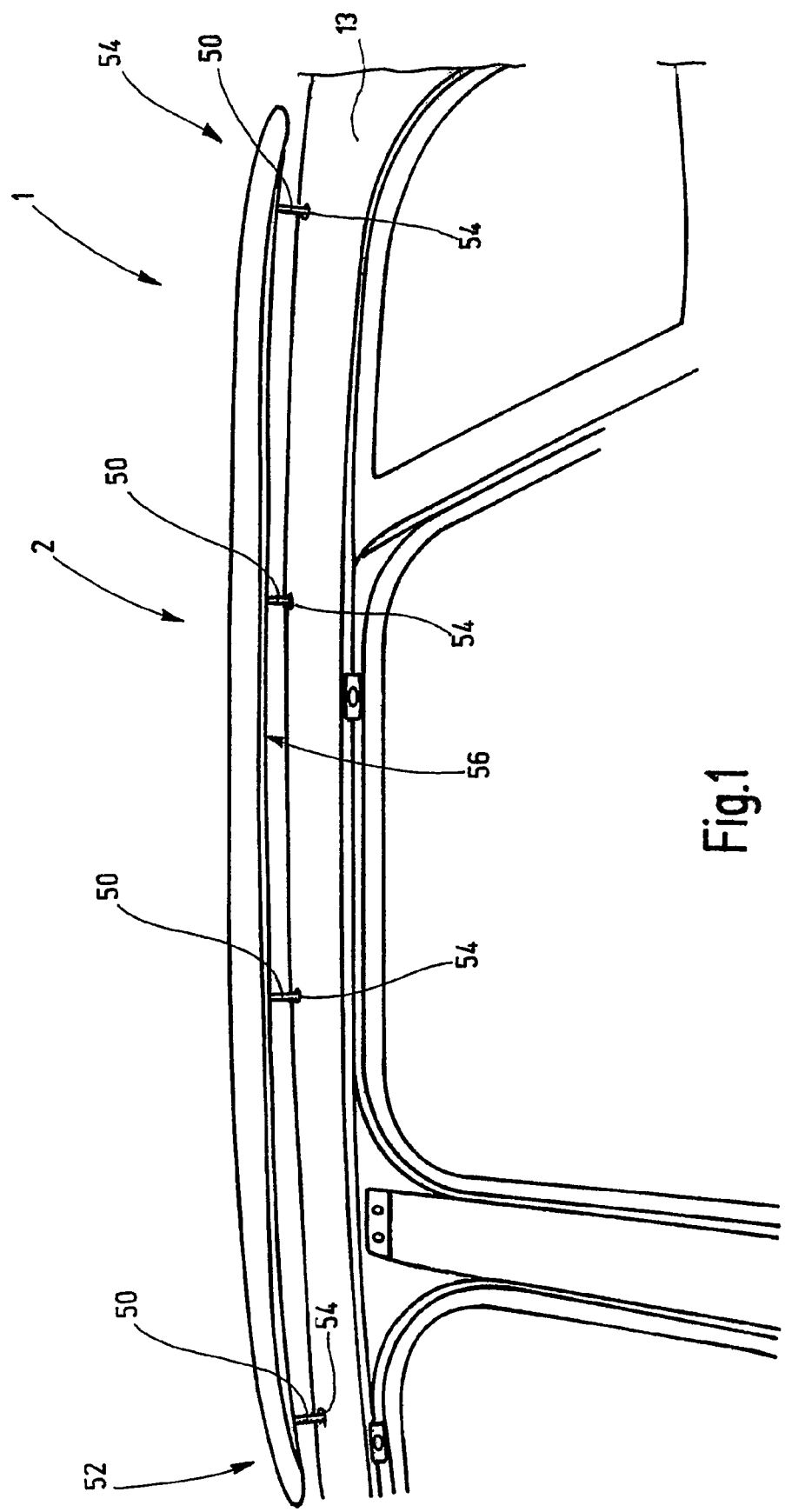

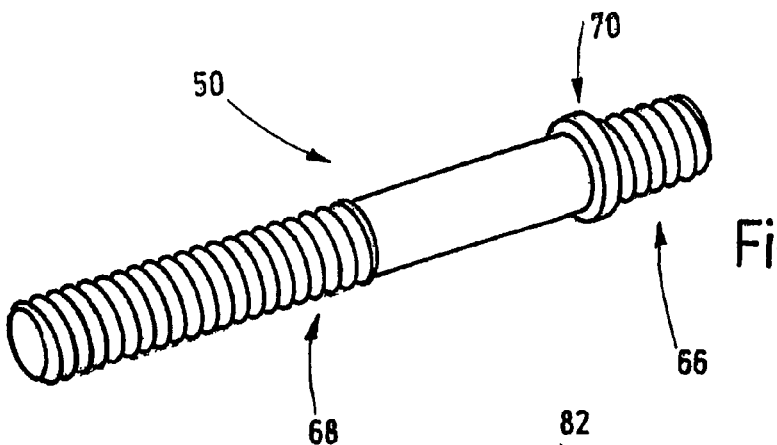
Fig.5
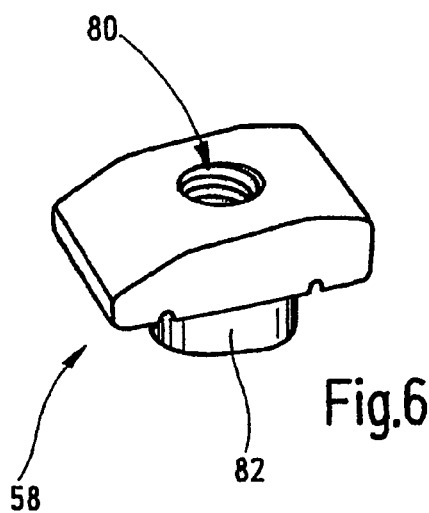
Fig.6
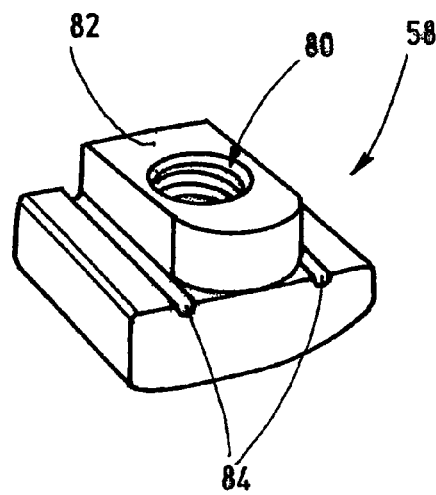
Fig.7
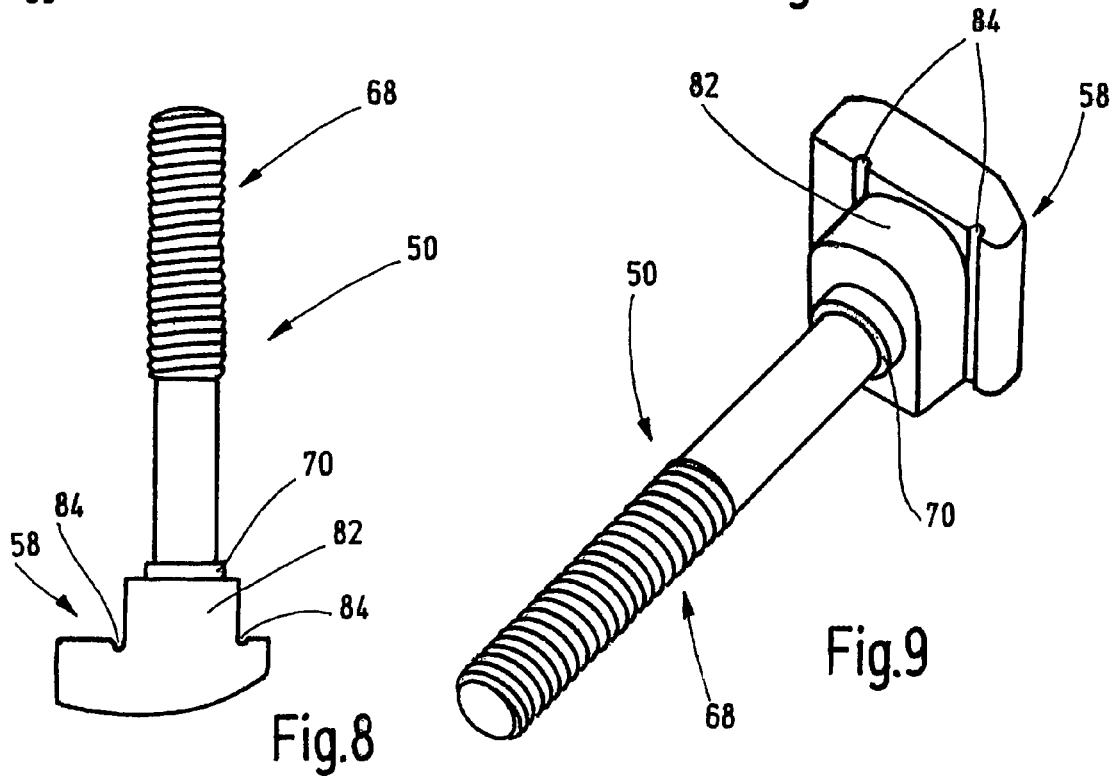
Fig.8
Fig.9

ROOF RACK SYSTEM FOR A VEHICLE, METHOD FOR PRODUCING THE ROOF RACK SYSTEM AND VEHICLE COMPRISING A ROOF RACK SYSTEM

CROSS-REFERENCE TO RELATED APPLICATIONS

This application is a National Stage of International application No. PCT/EP2005/010198, filed Sep. 21, 2005. This application claims the benefit of DE 10 2004 047 565.2, filed Sep. 24, 2004 and DE 10 2005 018 158.9, filed Apr. 20, 2005. The disclosure(s) of the above applications are incorporated herein by reference.

The invention relates to a roof rack system for a vehicle, specifically for a passenger car and an associated method for producing the roof rack system and vehicle with a roof rack system.

Passenger cars can have a roof rack system on their roof in the form of a roof rack which consists of two roof rails disposed parallel to one another. These roof rails can be designed to be one-piece or multi-piece. Roof rails which are designed to be three-piece or multi-piece have at least one center piece and two end pieces assembled to the center piece. The two end pieces are provided with foot supports which create a clearance to the vehicle roof surface. A corresponding foot support is located in the central area of the center piece. The known roof rack has proven itself and gives the vehicle a characteristic appearance.

The invention involves a novel and economical design for a roof rack system which is accompanied by a special visual effect.

For the roof rack system in accordance with the invention, provision is made for at least one roof rail which has a contact surface extending over the length of the roof rail which can be placed substantially continuously on the vehicle body and is conformed to the vehicle body. As a result of the foot support-free construction, the roof rail projects above the vehicle roof only to the depth of the rail, with extremely precise seating to the contour of the vehicle body, specifically to the side panel frame of the vehicle on which the roof rails can be mounted. The contact surface is substantially identical to the vehicle body contour. Covering means, such as for example, rubber moldings, are not necessary. It is possible to locate roof rails directly on the vehicle roof, projecting beyond it only slightly, which result furthermore in consistent and thus visually very pleasing edge gaps. The contouring of the roof rail is created by a bending process which gives it its shape. Provision is made for an attaching device to attach the roof rail to the vehicle body. The attaching device has a retaining element which is located in a roof rail cavity in the manner of a slot nut. The roof rail can be located to the vehicle roof in a manner invisible to the outside. The attachment can handle very heavy loads and can be installed without difficulty even in the flattened end areas of the roof rail.

The roof rail has at least one recess which is located on the side facing the vehicle roof. The recess extends in the longitudinal direction of the roof rail, starting from the ends of the roof rail. The width of the recess is less, specifically considerably less, than the width of the contact surface. The roof rail has an at least partially enclosed cavity. By means of the recess, a localized opening in the cavity (hollow profile) results. A retaining element, specifically a slot nut, is inserted into the cavity through this opening in the cavity. The slot nut is specifically a cast part. An attaching element is located on the retaining element, specifically a stud bolt with a thread which engages a thread in the slot nut. The thread is located on the slot nut in such a way that even when the slot nut has been inserted, the threaded opening can be reached through the recess. It is thereby possible in a next step to screw a stud bolt, which is at least partially provided with a thread, into the thread of the slot nut. It is also certainly possible in principle to manufacture slot nut and stud bolt in one piece, but the production process is simplified by the two-piece manufacture. The threads on the stud bolt are disposed in such a way that the thread on one end of the stud bolt engages the thread of the slot nut and a second thread on the stud bolt allows the secure attachment of the stud bolt to the vehicle body by means of a threaded connection. The recess can be enlarged at the ends of the roof rail to make introduction of the slot nut easier. This is helpful particularly when the roof rail flattens out at its ends. In an optional step an additional plastic locking element can be inserted subsequently into the cavity so that the slot nut is held fast between the end of the recess and the plastic locking element. This simplifies assembly since the slot nut is locked in place.

In cross-section, the roof rail has a profile. The cross-section of the slot nut is preferably matched to the inner cross-section of the roof rail. As a result, large forces acting between the vehicle body and the roof rack system can be absorbed safely. The slot nut preferably has a projection on the side facing the recess which engages the recess and thus facilitates guiding the slot nut and a stop for the slot nut inside the recess.

By means of the invention it is thus specifically possible to manufacture a single-piece roof rail since the load-bearing attachment for the roof rail is made by means of at least one retaining element which is connected by at least one attaching element to the vehicle body. Consequently, additional expensive feet to attach the roof rail can be eliminated. In addition, an almost gap-free positioning of the roof rail to the vehicle body can be achieved.

The recess can also be located at a distance from the ends of the roof rail, but by means of the proposed arrangement a particularly favorable arrangement of the load-bearing retaining and attaching elements results, as well as great rigidity for the roof rail.

DRAWINGS

The invention will now be explained in more detail on the basis of embodiments.

Figure 2:
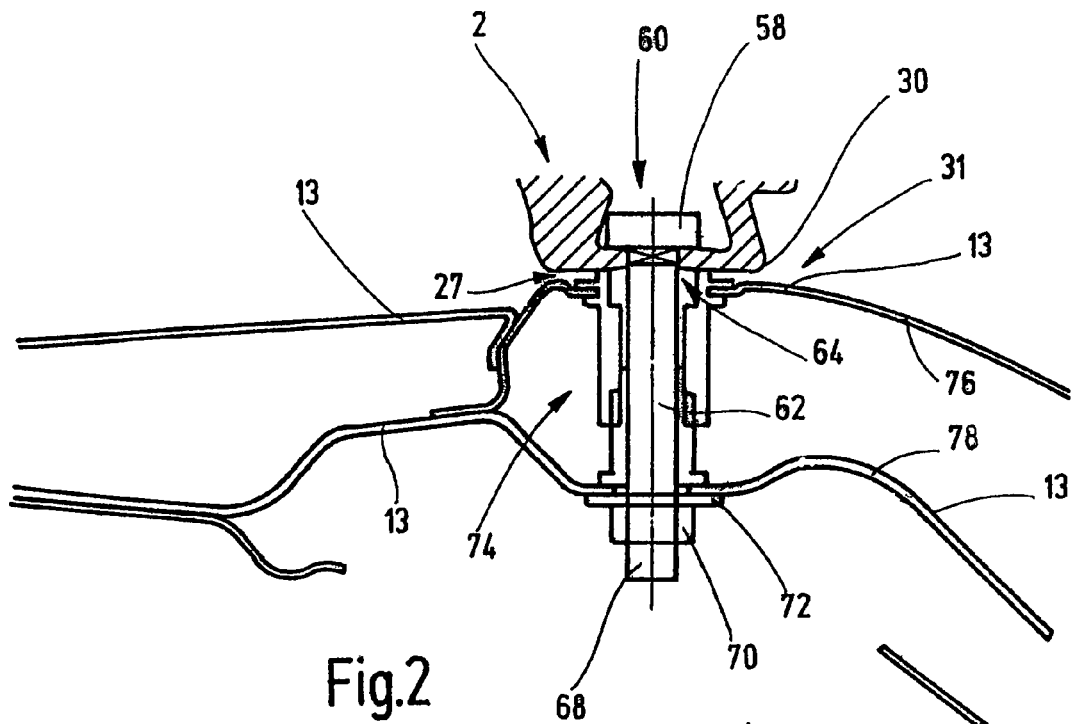
Figure 3:
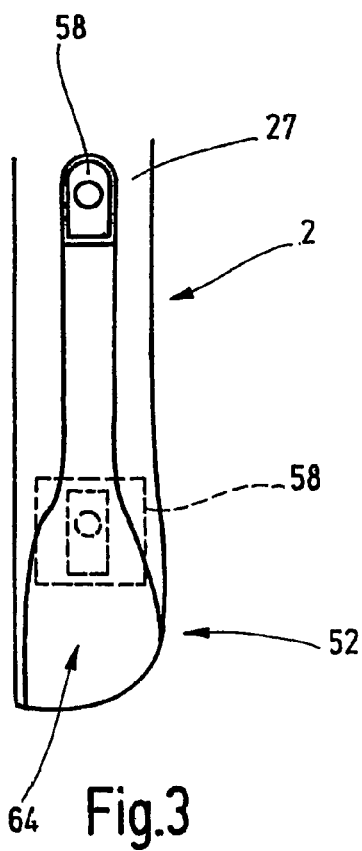
Figure 4:
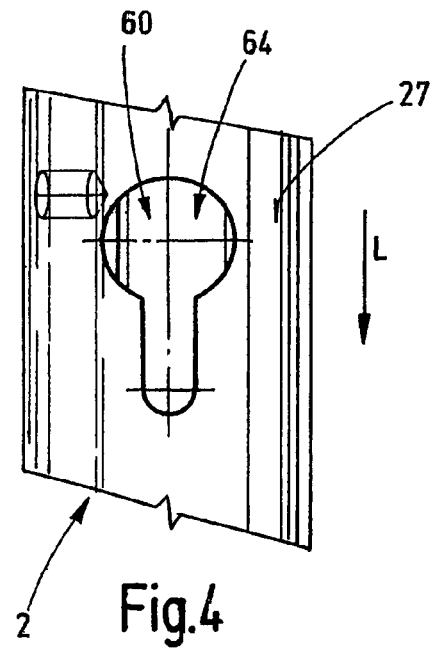
Figure 10:
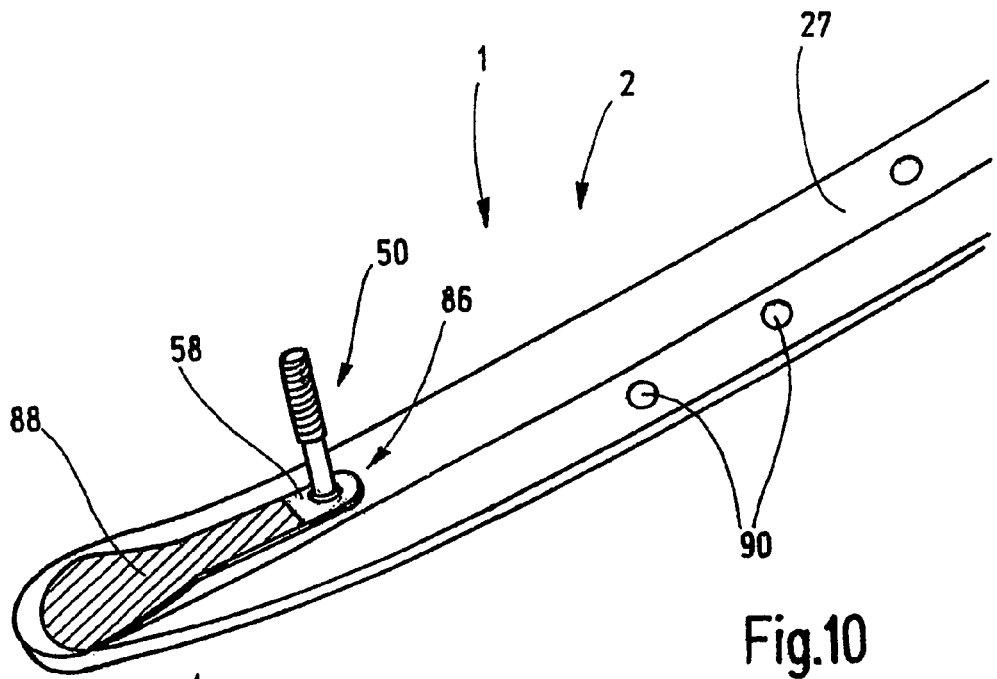
Figure 11:
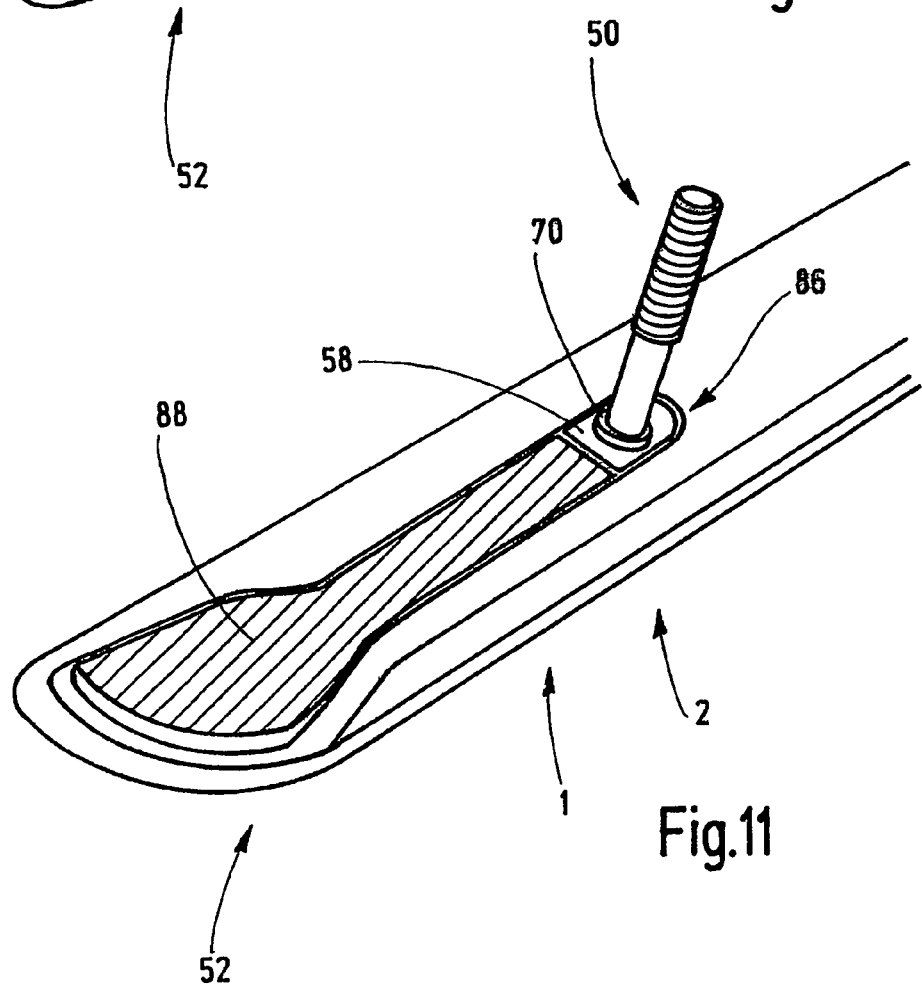
Figure 12:
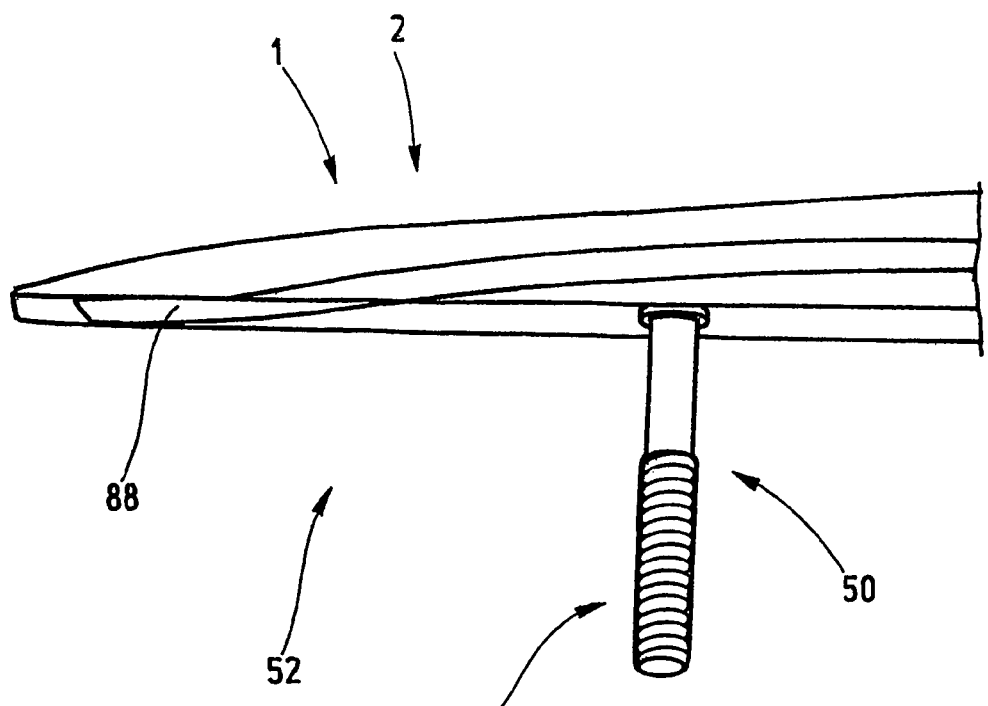
Figure 13:
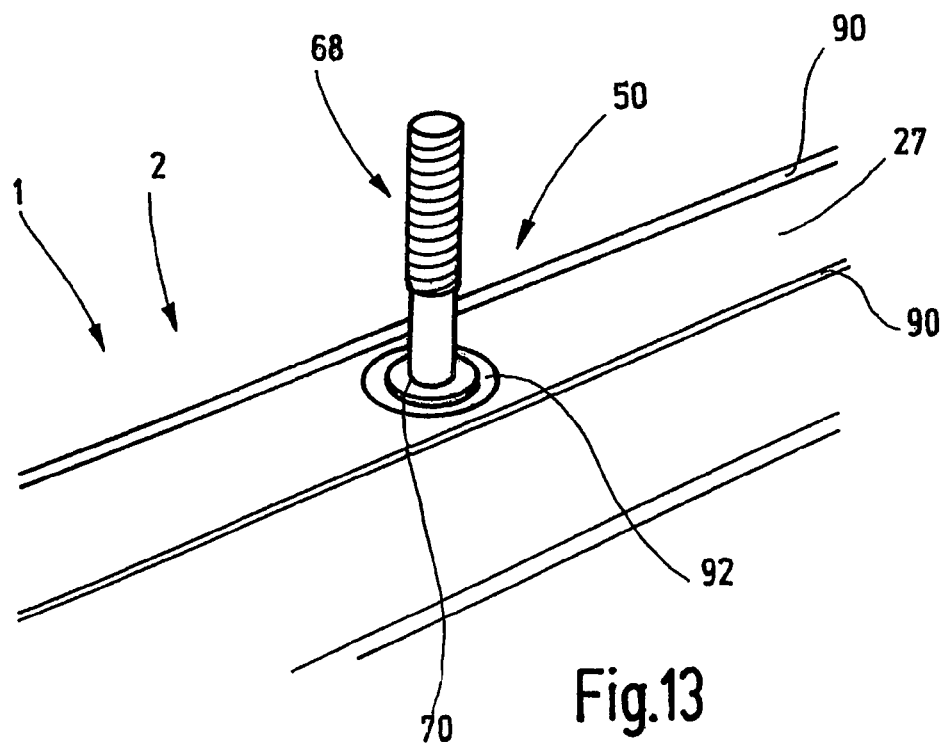
Figure 14:
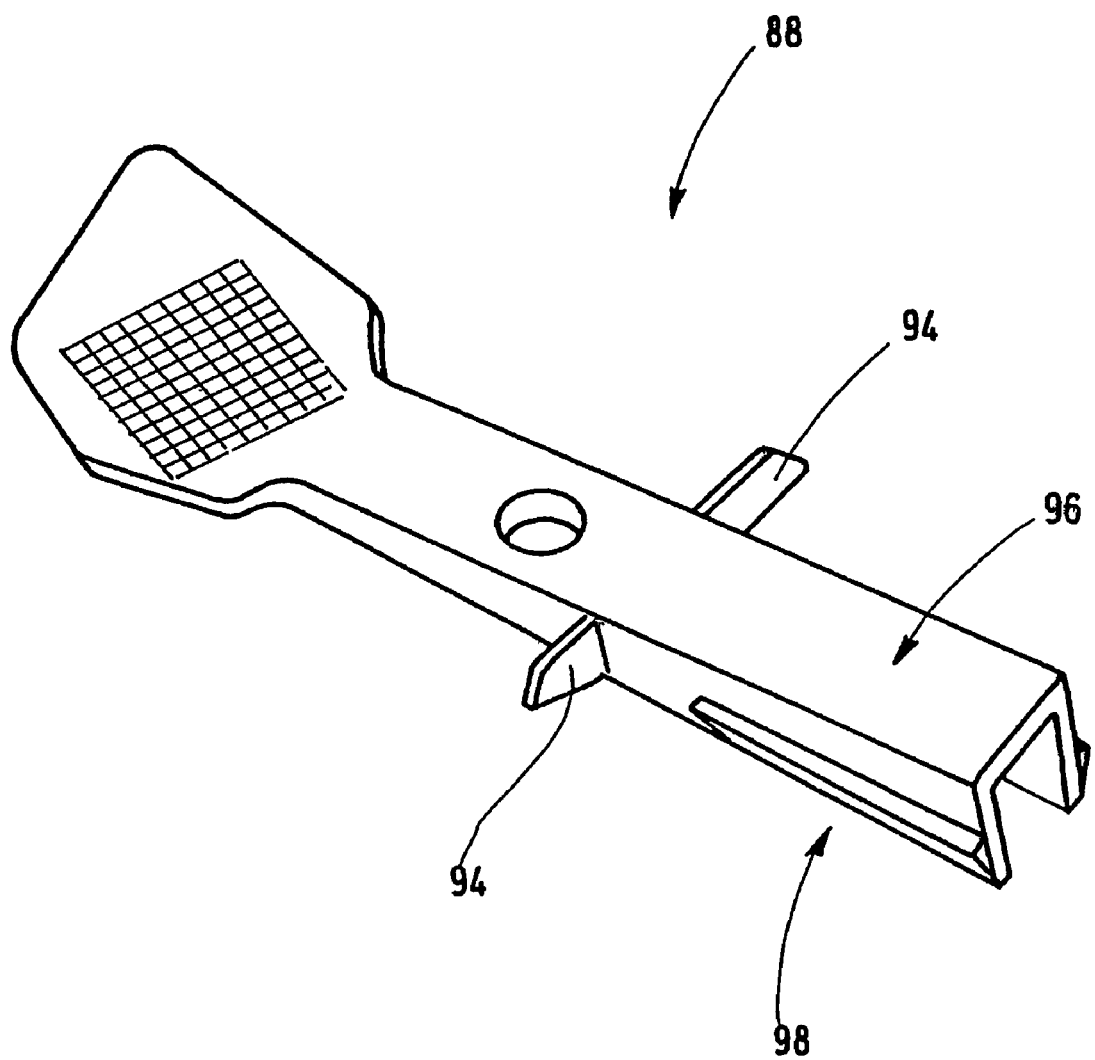
Figure 15:
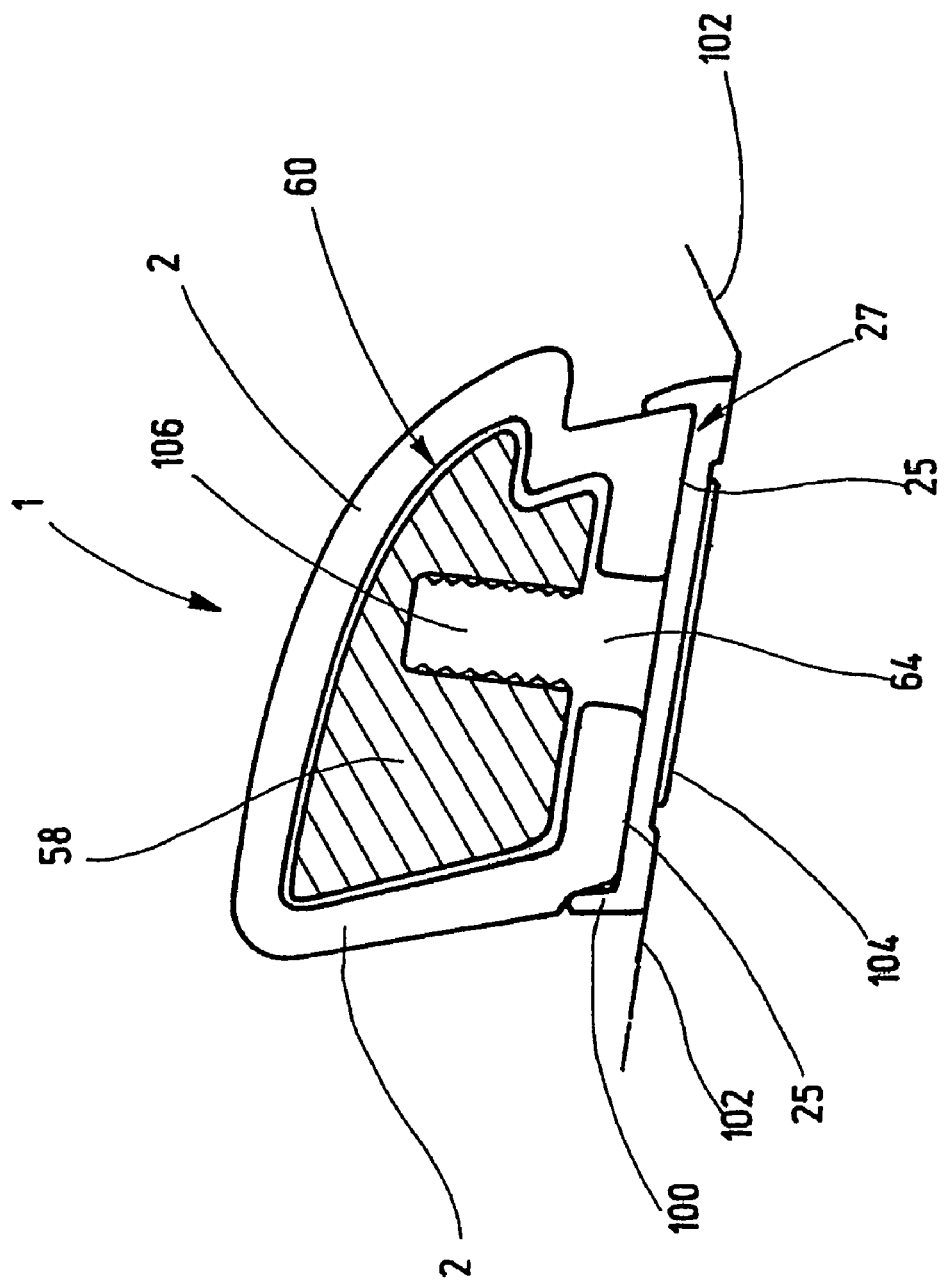
Figure 17:
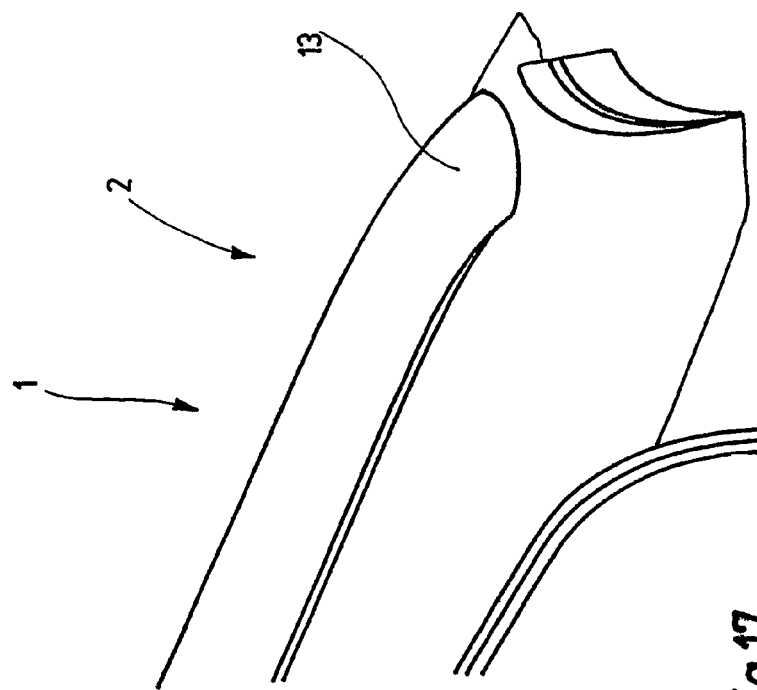
Figure 16:
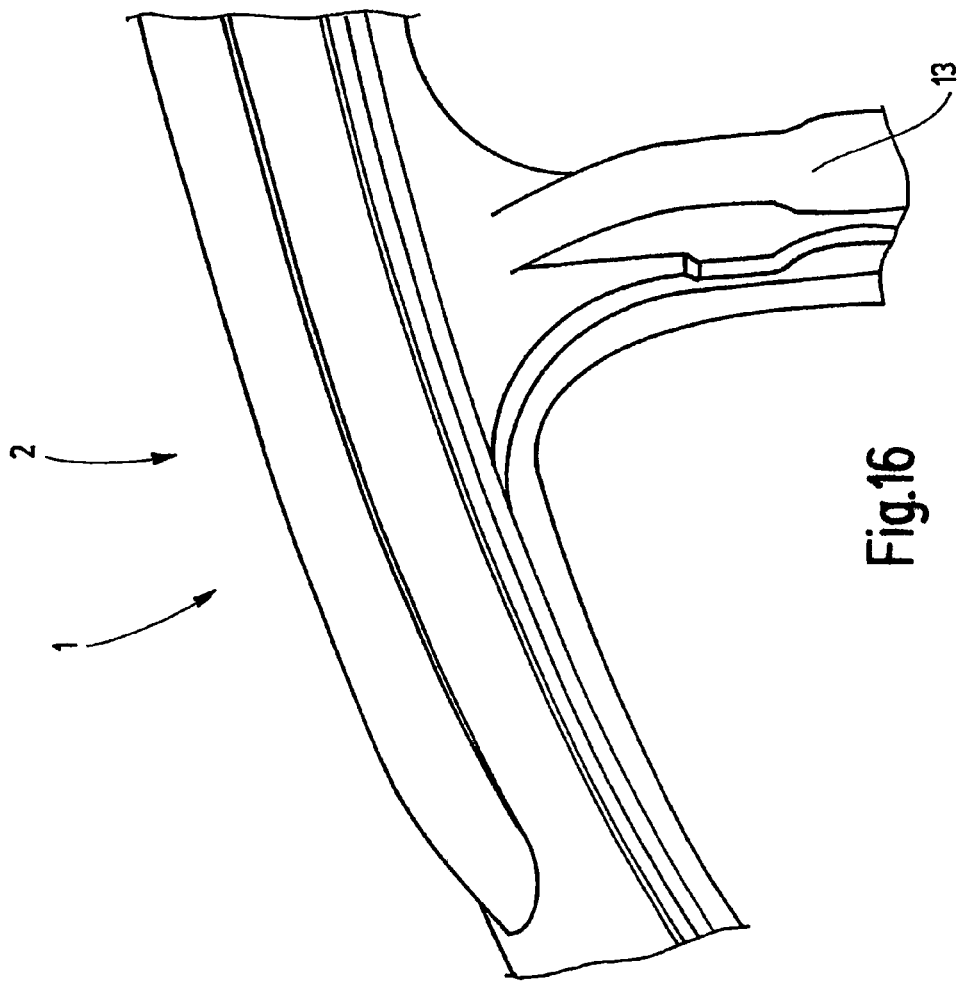

FIG. 1 shows the arrangement of a roof rail on a vehicle body,

FIG. 2 shows the attachment of the roof rail to the vehicle body by means of a slot nut and stud bolt, FIG. 3 shows a recess at one end of the roof rail, FIG. 4 shows a recess in the roof rail which is distanced from the end of the roof rail, FIG. 5 shows a stud bolt with two threads, FIG. 6 shows a slot nut in a top view, FIG. 7 shows a slot nut in a view from below, FIG. 8 shows a top view of a slot nut with a stud bolt screwed in, FIG. 9 shows a three-dimensional view of a slot nut with a stud bolt screwed in, FIG. 10 shows a section from a roof rail, FIG. 11 shows one end of a roof rail in a three-dimensional view, FIG. 12 shows the end of a roof rail in side view, FIG. 13 shows a stud bolt in a blind rivet located in the roof rail, FIG. 14 shows a plastic locking element and FIG. 15 shows a cross-section through a roof rail with a slot nut inserted, FIG. 16 shows the forward end of the roof rail and FIG. 17 shows the rear end of the roof rail.

FIG. 1 shows a roof rack system 1 with a roof rail 2. Four stud bolts 50 are located on the roof rail, where the stud bolts 50 are screwed into slot nuts at the forward end 52 of the roof rail 2, or the rear end 54 of the roof rail 2 respectively, while the two other stud bolts are screwed into blind rivets. Matching holes 54 are located in the vehicle body 13 into which the stud bolts are inserted and then fastened from inside of the body. Fastening from the inside is preferably undertaken by nuts which coact with a thread formed on the stud bolt. It can be seen that the roof rail 2 is flattened at its forward and rear end 52, 54. Furthermore, an edge 56 for attaching a roof rack can be seen in which a claw of a roof rack attachment can engage.

FIG. 2 reveals a roof rail 2 which is located on a vehicle body 13. The slot nut 58 can be seen which is located in a cavity 60 of the roof rail 2. A stud bolt 62 which extends through a recess 64 in the roof rail 2 is screwed into the slot nut 58. A nut 70 is located on a second thread 68 which interacts with the washer 72 to ensure the attachment of the roof rack 2 of a vehicle body 13. To ensure that the space between an upper panel 76 and a lower panel 78 is not compressed during assembly of the roof rack 2, a spacer system 74 is provided. The function of this spacer system 74 is known from German Utility Model Number 202 05 087.4, registered on Jun. 13, 2002. The explanations given there on the spacer system 74 are hereby expressly made part of this application.

FIG. 3 shows a roof rail 2 in the view from the contact surface 27. It can be seen clearly that the recess 64 is wider at the forward end 52 of the roof rail 2. This makes insertion of the slot nut 58 easier. A broken line shows the slot nut 58 in a position in which it has just been inserted into the roof rail 2 in the enlarged area of the recess 64.

FIG. 4 shows a recess 64 which is not located at one end of the roof rail 2. Here too, an enlarged area is shown through which the slot nut 58 can be inserted into the cavity of the roof rail 2. By being displaced in the longitudinal direction L of the roof rail 2, the slot nut is shifted into a narrower area of the recess 64 so that the slot nut 58 cannot escape from the cavity 60.

FIG. 5 shows a stud bolt 50 with a first thread 66, a second thread 68 and a retaining lip 70. The first thread 66 engages a thread of a slot nut 58, while the thread 68 serves to attach the roof rail 2 from the vehicle interior.

FIG. 6 shows a slot nut 58 with a full-length thread 80. The cross-section of the slot nut 58 is matched to the internal profile of the roof rail 2. In addition, the slot nut 58 has a projection 82 with which the slot nut 58 is guided inside the recess 64.

FIG. 7 shows a slot nut 58 from the underside. Two grooves 84 can be seen clearly here whose effect is to guide the slot nut 58 inside the recess 64.

FIG. 8 shows a slot nut 58 with stud bolt 50 screwed in. The lip 70 provides a well defined seat for the stud bolt 50.

FIG. 9 shows a three-dimensional view of the slot nut 58 with stud bolt 50 screwed in. It can be seen here that the projection 82 is rounded. This curvature allows matching contact with the end of the recess 64 which the slot nut 58 strikes when it is positioned. A rounded end for the recess 64 is advantageous with respect to manufacture and rigidity.

FIG. 10 shows an area of a roof rail 2 when seen from the side of the contact surface 27, that is from the underside. A stud bolt 50 is screwed into the slot nut 58. The slot nut is locked in position in the longitudinal direction on the one side by the end of the recess 86 and on the other side by the plastic locking element 88. The two blind holes 90 allow a cross bar to be held in place.

FIG. 11 shows the forward area 82 of a roof rail 2 and clarifies the insertion of the plastic locking element 88.

FIG. 12 shows the forward area 52 of a roof rail 2 in a side elevation. The edge 56 for attaching a roof rack can be seen clearly here.

FIG. 13 shows a stud bolt 50 located in a blind rivet 92. The contact surface 27 has lateral raised edges 90 which, among other things, can clearly define the contact of the roof rail 2 to the vehicle body 13 or serve to position a foam seal under the roof rail 2.

FIG. 14 shows a plastic locking element 88 with guide wings 94. The plastic locking element 88 is shaped in such a way that it forms an approximately planar termination to the contact surface 27 with its underside 96 and follows the shape of the roof rail 2 with its upper side 98.

FIG. 15 shows a further embodiment. Here, the contact surface 27 is formed on two wide bases 25 and rests on a seal 100. The surface of the roof is represented by the broken line 102. The seal 100 lies on an adhesive strip 104. The slot nut 58 has a thread 106 and is inserted into a cavity 60 of the roof rail 2. There is no need for a seal 100 with a roof rack system 1 in accordance with the invention since only very narrow gaps result.

The manufacturing process will be explained hereinafter in more detail.

After being delivered, the raw stock for producing a roof rail is shaped to match the vehicle contour by mechanical methods or by means of hydroforming or gas-pressure forming methods so that a roof rack, or roof rail, system with gap-free seating is created.

An extruded profile tube, a rolled profile tube or a stamped profile tube can be used as the base. In the case of the last two manufacturing methods, the seam is then preferably welded.

Following this, the ends of the roof rail are machined, usually employing a metal-removing process to introduce retainers. Specifically, milling in the longitudinal direction of the roof rail in a milling fixture is advantageous.

Machining is necessary in order to mount assembly material, the slot nut that is inserted and the stud bolts that are screwed in, since the roof rack can be installed particularly easily from the inside of the vehicle because it sits directly on the roof.

Methods producing semi-finished goods can be used, which represent an overall price reduction compared with the techniques previously employed.

The ends are given an accessible cavity, effectively a pocket, for a slot nut with thread. This slot nut, preferably a casting, specifically GS 38, offers a high degree of pull-out resistance. The slot nut is preferably kept in position by a plastic injection molded part. In order to be able to transfer the required payloads from the roof-rail rack system to the vehicle roof, stud bolts are inserted at regular intervals through blind rivets inserted into a simple hole. The stud bolts represent the connection to load-bearing parts in the body. Since the principal weight rests on the two slot nuts, it is possible to manage here using an adequately dimensioned box nut.

In order to avoid damage to the painted vehicle from scratches, a foam seal, for example of EPDM, is applied to the underside of the roof rail.

What is claimed is:

1. A roof rack system for a vehicle comprising:
   at least one roof rail configured in one piece, the at least one roof rail having a vehicle body contact surface extending over the length thereof which can be placed substantially continuously on the vehicle body and conforming to a vehicle body contour;

an attaching device for connecting the at least one roof rail to a body of the vehicle, the attaching device having a retaining element located in a cavity of the roof rail in the form of a slot nut;

a locking element locking the retaining element in position in the cavity;

the at least one roof rail having at least one recess in the contact surface to create an access to the cavity, the recess having an enlarged area for receiving the locking element and through which the slot nut may pass to insert the slot nut into the cavity and the recess having a narrowed area into which the slot is inserted for retention within the cavity, the locking element extending into the narrowed area to abut the slot nut.

2. The roof rack system of claim 1, wherein the roof rail has a hollow profile with the cavity.

3. The roof rack system of claim 1, further comprising an attaching element located in the retaining element to attach the roof rail to the vehicle body.

4. The roof rack system of claim 3, wherein the attaching element is a stud bolt.

5. The roof rack system of claim 3, wherein the attaching element is screwed into the retaining element.

6. The roof rack system of claim 4, wherein the stud bolt has a first thread, a second thread and a retaining lip lying between the threads, where the first thread is screwed into a thread of the retaining element.

7. The roof rack system of claim 1, wherein a cross-section of the retaining element is matched to the inside profile of the roof rail.

8. The roof rack system of claim 1, wherein the retaining element has a projection acting to guide it in the recess.

9. The roof rack system of claim 8, wherein the projection has a curvature which abuts the end of the recess in matching contact.

10. The roof rack system of claim 1, wherein the locking element is a plastic locking element.

11. The roof rack system of claim 1, wherein the contact surface is a contact surface conformed by post-machining.

12. The roof rack system of claim 1, wherein the contact surface is configured and located such that at least an outer lateral edge of the roof rail assigned to the vehicle body forms a shadow joint with the vehicle body.

13. The roof rack system of claim 1, wherein the contact surface is formed on at least a base.

14. The roof rack system of claim 1, wherein a surface of the roof rail is aluminum, polished and surface treated by at least one of anodizing and paint coating.

15. The roof rack system of claim 1, wherein a surface of the roof rail is provided with a surface coating.

16. The roof rack system of claim 15, wherein the surface coating is at least one of chrome plating, powder coating and paint coating.

17. A method for producing the roof rack system of claim 1, wherein, with the roof rail formed in one piece, the roof rail is bent to correspond to a vehicle body contour and by means of a material-removing step at least one recess is created in a longitudinal direction of the roof rail at the ends of the roof rail.

18. The method of claim 17, wherein the roof rail is aluminum and wherein following the metal-removing machining the roof rail is surface treated by at least one of polishing and anodizing, and paint coating.

19. The roof rack system of claim 1 in combination with the vehicle, wherein the vehicle body has at least one gutter-shaped depression which partially accommodates a roof rail in the area of its contact surface.

20. The roof rack system of claim 1 in combination with the vehicle, the system having two roof rails located parallel on two side panel frames of the vehicle.

21. A roof rack system for a vehicle comprising: a roof rail having a contact surface extending over a length thereof for engagement with the vehicle body, the roof rail defining a cavity and having recess in a vehicle body contact surface providing access to the cavity, the recess having an enlarged portion and a narrowed portion;

an attaching device for securing the roof rail to the body of the vehicle, the attaching device including a slot nut; and a locking element locking the slot nut in position in the cavity;

wherein the slot nut is received in the enlarged portion and is insertable through the enlarged portion of the recess, and further wherein the slot nut is moveable to the narrowed portion of the recess for retention in the cavity such that slot nut slides along the recess from the enlarged portion to the narrowed portion as the roof rail is secured to the body of the vehicle and the locking element is received in the enlarged portion and extends into the narrowed portion to abut the slot nut.

22. The roof rack system of claim 1 wherein the slot nut slides along the recess from the enlarged area to the narrowed area as the at least one roof rail is secured to the vehicle body.

* * * * *